(12) United States Patent
Umimura

(10) Patent No.: US 11,006,013 B2
(45) Date of Patent: May 11, 2021

(54) IMAGE PROCESSING APPARATUS, HAVING SECOND PROCESSOR TO VERIFY BOOT PROGRAM HAS BEEN ALTERED, METHOD OF CONTROLLING THE SAME, AND STORAGE MEDIUM

(71) Applicant: CANON KABUSHIKI KAISHA, Tokyo (JP)

(72) Inventor: Kiyokazu Umimura, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/251,441

(22) Filed: Jan. 18, 2019

(65) Prior Publication Data

US 2019/0230240 A1 Jul. 25, 2019

(30) Foreign Application Priority Data

Jan. 24, 2018 (JP) .............................. JP2018-009942

(51) Int. Cl.
| | | |
|---|---|---|
| *G06F 3/12* | (2006.01) | |
| *H04N 1/00* | (2006.01) | |
| *G06F 1/26* | (2006.01) | |
| *H04N 1/327* | (2006.01) | |
| *G06F 21/57* | (2013.01) | |
| *G06K 15/00* | (2006.01) | |

(52) U.S. Cl.
CPC ....... *H04N 1/00888* (2013.01); *G06F 3/1217* (2013.01); *G06F 3/1229* (2013.01); *H04N 1/00209* (2013.01); *H04N 1/00907* (2013.01); *G06F 1/263* (2013.01); *G06F 21/57* (2013.01); *G06K 15/4055* (2013.01); *H04N 1/32763* (2013.01)

(58) Field of Classification Search
None
See application file for complete search history.

(56) References Cited

U.S. PATENT DOCUMENTS

| | | | | |
|---|---|---|---|---|
| 2007/0183807 A1* | 8/2007 | Park | ...................... | G06F 1/3215 399/88 |
| 2011/0035739 A1* | 2/2011 | Harada | .................. | G06F 1/3203 717/168 |
| 2013/0007497 A1* | 1/2013 | Kim | ....................... | G06F 1/3218 713/324 |
| 2015/0022838 A1* | 1/2015 | Takiguchi | ............. | G06F 3/1221 358/1.13 |
| 2015/0074384 A1* | 3/2015 | Yajima | ................... | G06F 21/575 713/2 |

FOREIGN PATENT DOCUMENTS

JP 2013149135 A 8/2013

\* cited by examiner

*Primary Examiner* — Haris Sabah
(74) *Attorney, Agent, or Firm* — Venable LLP

(57) ABSTRACT

An image processing apparatus comprises a CPU for controlling the image processing apparatus and a microcomputer that verifies alteration of a program that is stored in a nonvolatile memory and that the CPU executes, and that outputs a notification signal that indicates the verification result. The image processing apparatus comprises a power source control unit for controlling a power source of the image processing apparatus, and the power source control unit, when the image processing apparatus is activated, supplies power to the microcomputer, and when a notification signal outputted from the microcomputer is received, holds the verification result that the notification signal indicates and shuts off the supply of power to the microcomputer.

15 Claims, 6 Drawing Sheets

IMAGE PROCESSING APPARATUS, HAVING SECOND PROCESSOR TO VERIFY BOOT PROGRAM HAS BEEN ALTERED, METHOD OF CONTROLLING THE SAME, AND STORAGE MEDIUM

BACKGROUND OF THE INVENTION

Field of the Invention

The present invention relates to an image processing apparatus that executes a secure boot for verifying authenticity of an activation program, a method of controlling the same, and a storage medium.

Description of the Related Art

In recent years, demand for device security is increasing. For example, when a device is attacked by malware, there is a possibility that application software within the device will be infiltrated, data saved on the device will be stolen, or other devices connected to a network will be attacked.

Accordingly, as countermeasures, there are secure boot techniques for enhancing security of devices such that malware is not allowed to be executed on an OS. A secure boot is something that, firstly, verifies the authenticity of activation of a BIOS when a device is activated, then verifies the authenticity of an OS in accordance with the BIOS for which the authenticity was preserved, and finally verifies and executes application software in accordance with the OS for which the authenticity was preserved. In this way, techniques for activating an apparatus in a state where validity of programs is preserved by verifying validity of each program in order at a time of activation of a device is known. For example, in Japanese Patent Laid-Open No. 2013-149135, a technique in which a secure boot function is executed by a default setting in order to preserve validity of programs of a device is proposed.

However, there is a problem as is recited below in the foregoing conventional technique. In the foregoing conventional technique, in order to determine whether to skip execution of a secure boot, a microcomputer is connected to a constantly energized power source in a device that executes a secure boot function by a default setting. For this reason, there is the problem that wasteful power consumption becomes high due to power being supplied to the microcomputer regardless of whether the secure boot function is executed.

SUMMARY OF THE INVENTION

The present invention enables realization of a mechanism by which power consumption of an apparatus that performs alteration verification is reduced by efficiently detecting alteration of an activation program on a microcomputer supporting a secure boot and suitably controlling a power source supply to the microcomputer.

One aspect of the present invention provides an image processing apparatus, comprising: a control unit configured to control the image processing apparatus; a verification unit configured to verify an alteration of a program that is stored in a nonvolatile memory and that the control unit executes, and to output a notification signal indicating a verification result; and a power source control unit configured to control a power source of the image processing apparatus, and, when the image processing apparatus activates, to supply power to the verification unit, and to, when a notification signal outputted from the verification unit is received, hold a verification result that the notification signal indicates and shut off the supply of power to the verification unit.

Another aspect of the present invention provides a method of controlling an image processing apparatus that comprises a control unit for controlling an apparatus, a verification unit for verifying an alteration of a program that is stored in a nonvolatile memory and that the control unit executes, and outputting a notification signal indicating a verification result, and a power source control unit for controlling a power source of the apparatus, the method comprising: in the power source control unit, when the image processing apparatus activates, supplying power to the verification unit and when a notification signal outputted from the verification unit is received, holding a verification result that the notification signal indicates and shutting off the supply of power to the verification unit.

Still another aspect of the present invention provides a non-transitory computer-readable storage medium storing a computer program for causing a computer to execute a method of controlling an image processing apparatus that comprises a control unit for controlling an apparatus, a verification unit for verifying an alteration of a program that is stored in a nonvolatile memory and that the control unit executes, and outputting a notification signal indicating a verification result, and a power source control unit for controlling a power source of the apparatus, the method comprising: in the power source control unit, when the image processing apparatus activates, supplying power to the verification unit and when a notification signal outputted from the verification unit is received, holding a verification result that the notification signal indicates and shutting off the supply of power to the verification unit.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<System Configuration>

Figure 1:
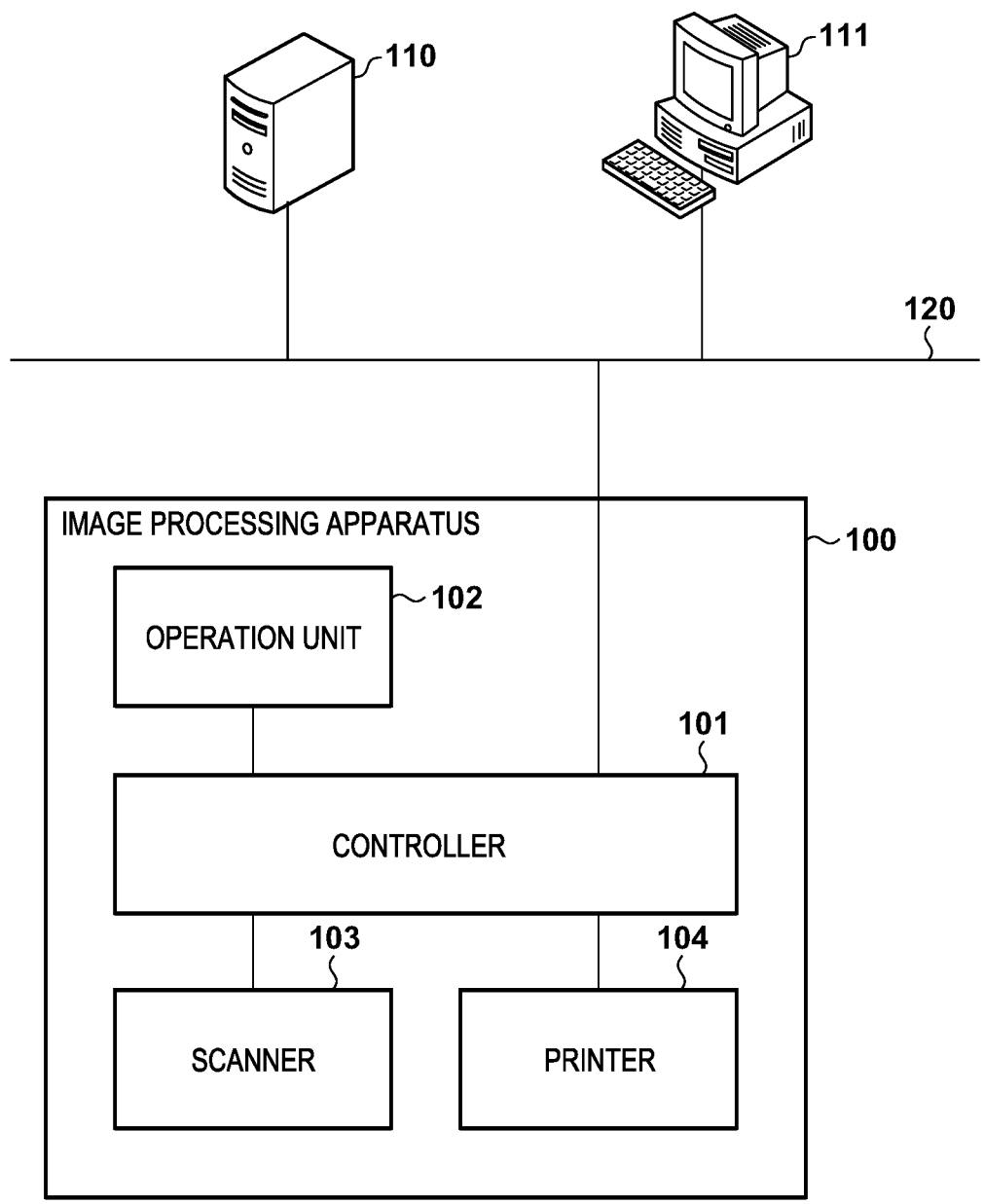
FIG. 1 is a view for illustrating a system configuration of an information processing system according to an embodiment.

Below, description will be given for a first embodiment of the present invention. Firstly, with reference to FIG. 1, a system configuration of an information processing system according to the present embodiment will be described.

In the information processing system, an image processing apparatus 100, a print server 110, and a client PC 111 are connected to be able to mutually communicate via a LAN 120. The image processing apparatus 100 performs image input/output and transmission/reception, and image processing related thereto. The image processing apparatus 100 comprises a controller 101, an operation unit 102 that is user interface, a scanner 103 that is an image input device, and a printer 104 that is an image output device. The operation unit 102, the scanner 103, and the printer 104 are each connected to the controller 101, and the controller 101 controls operation of each unit.

The controller 101, via a later-described network I/F 205, is connected to a LAN (Local Area Network) 120, and performs communication with the print server 110 and the client PC 111. A user, in the client PC 111, generates a print job for which printing of an image should be performed, and instructs print processing. By this, the print job is provided to the image processing apparatus 100 via the print server 110 and the LAN 120.

The operation unit 102 is a user interface of the image processing apparatus 100, and in addition to mechanical hardware buttons, comprises a liquid crystal display panel that has both a display unit and an operation unit, and in addition to transferring information to the user, receives user input. The scanner 103 is an image reading apparatus that reads an original and outputs image data. The printer 104 is a printing apparatus that records an image on a memory medium based on image data. By using these components, the image processing apparatus 100 can provide services such as printing, copying, scanning, facsimile transmission/reception, SEND, and the like.

<Image Processing Apparatus Hardware Configuration>

Figure 2:
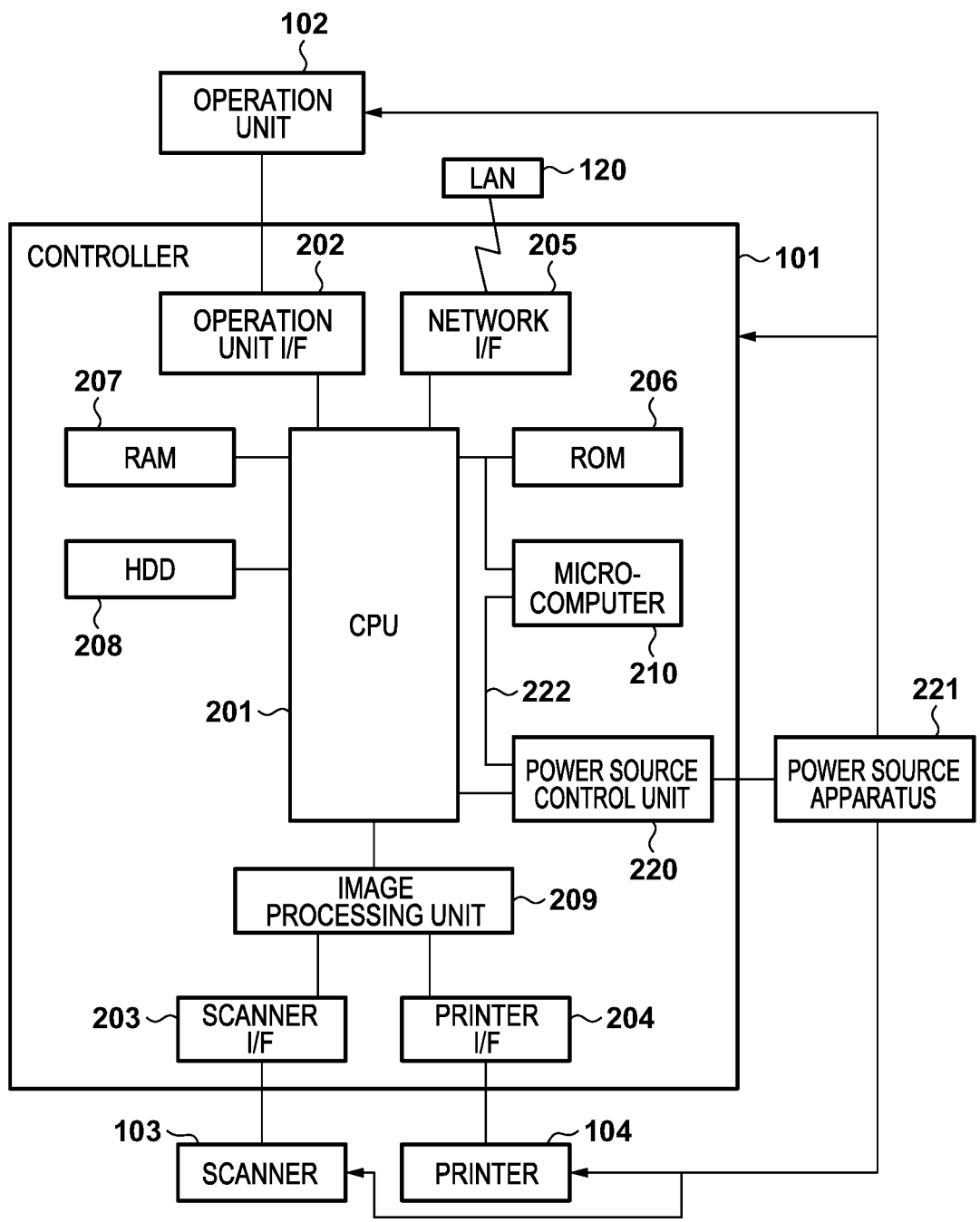
FIG. 2 is a view for illustrating a hardware configuration of an image processing apparatus according to an embodiment.

Next, with reference to FIG. 2, a configuration of the controller 101 according to the present embodiment is described. The controller 101 controls the scanner 103 which is connected to a scanner I/F 203 and the printer 104 which is connected to a printer I/F 204. Also, the controller 101, via the network I/F 205, performs input/output of image data and device information with an external device connected to the LAN 120, such as the print server 110 or the client PC 111. The controller 101 comprises a CPU 201, an operation unit I/F 202, the scanner I/F 203, the printer I/F 204, the network I/F 205, a ROM 206, a RAM 207, an HDD 208, an image processing unit 209, a microcomputer 210, and a power source control unit 220.

The CPU 201 is a central processing unit for controlling the primary control of the image processing apparatus 100. The CPU 201, via a system bus, is connected to the ROM 206 (Read Only Memory), the RAM 207 (Random Access Memory), and the HDD 208 (Hard Disk Drive). Furthermore, the CPU 201 is connected to the network I/F 205 and the operation unit I/F 202.

The ROM 206 is a boot ROM and stores an activation program that is necessary for system activation. Here, in the ROM 206, at least the activation program of the CPU 201 is stored. The RAM 207, as a main storage unit of the CPU 201, is memory that can be read/written as necessary in order to provide a work region, and is used as an image memory for temporarily storing image data that is internally processed. The HDD 208 is a nonvolatile memory and stores a program of an operating system and applications and setting value data and user data that must be held after the power source of the image processing apparatus 100 is shut off. By the CPU 201 executing processing based on programs stored in the ROM 206, the HDD 208, or the like, functions of the image processing apparatus 100 are realized.

The microcomputer 210 is a microcomputer provided on a single chip, and performs alteration verification of an activation program that the CPU 201 executes. The microcomputer 210 holds a public key for performing alteration verification internally. The microcomputer 210 is connected with the ROM 206 via a bus. The microcomputer 210 obtains signature data stored in the ROM 206, and obtains a hash value of the signature data by combining the obtained signature data with a public key in the microcomputer 210. Also, the microcomputer 210 calculates a hash value from the activation program of the CPU 201 stored in the ROM 206, and performs alteration verification of the activation program by comparing with the hash value of the signature data. Also, the microcomputer 210 is connected to the power source control unit 220 and a signal line 222 in order to notify the results of alteration verification. Here, if the result of alteration verification is that alteration has not been performed, the microcomputer 210 outputs to the power source control unit 220 via the signal line 222 a notification signal 320 described later.

The network I/F 205 is an interface for connecting with the LAN 120, and input/output of data with respect to the LAN 120 is performed thereby. By this, an external apparatus connected to the LAN 120 can perform communication with the print server 110 and the client PC 111, for example.

The operation unit I/F 202 is an interface for performing input/output with the operation unit 102 configured by a liquid crystal touch panel. The CPU 201, via the operation unit I/F 202, outputs image data to be displayed on the operation unit 102. Also, the operation unit I/F 202 is used to communicate data that a user inputted via the operation unit 102 to the CPU 201.

The scanner I/F 203 and the printer I/F 204 are connected to the image processing unit 209. The scanner I/F 203 and the printer I/F 204 are interfaces for connecting the scanner 103 and the printer 104 respectively to the controller 101. The image processing unit 209 performs image processing such as correction, processing, and editing with respect to input image data read from the scanner 103. After that, the image processing unit 209 performs color conversion, filter processing, and resolution conversion processing on print output image data that is outputted to the printer 104.

The power source control unit 220 switches on and off the power source supply to each unit in accordance with the operation state of the image processing apparatus 100. The power source control unit 220 receives control signals via the system bus from the CPU 201, and based on the received control signals, performs power supply control by transmitting control signals to a power source apparatus 221 which is a power source supply unit. The power source apparatus 221 receives a power source from a commercial power source 301 that will be described later, and based on the control signals received from the power source control unit 220, supplies power to each unit of the image processing apparatus 100. The power source apparatus 221 is constantly energized and can supply power as long as it is connected to the commercial power source 301 by a power cable. The power source apparatus 221 comprises a power source circuit of a first power source unit 302 and a second power source unit 306 illustrated in FIG. 3 in order to output DC power to each unit of the image processing apparatus 100. Also, the power source control unit 220, in a case where the result of alteration verification by the microcomputer 210 is that alteration has not been performed, receives a notification signal 320 from the microcomputer 210, de-asserts the reset signal 321 of the CPU 201, and activates the CPU 201.

<Image Processing Apparatus Power Source Configuration>

Figure 3:
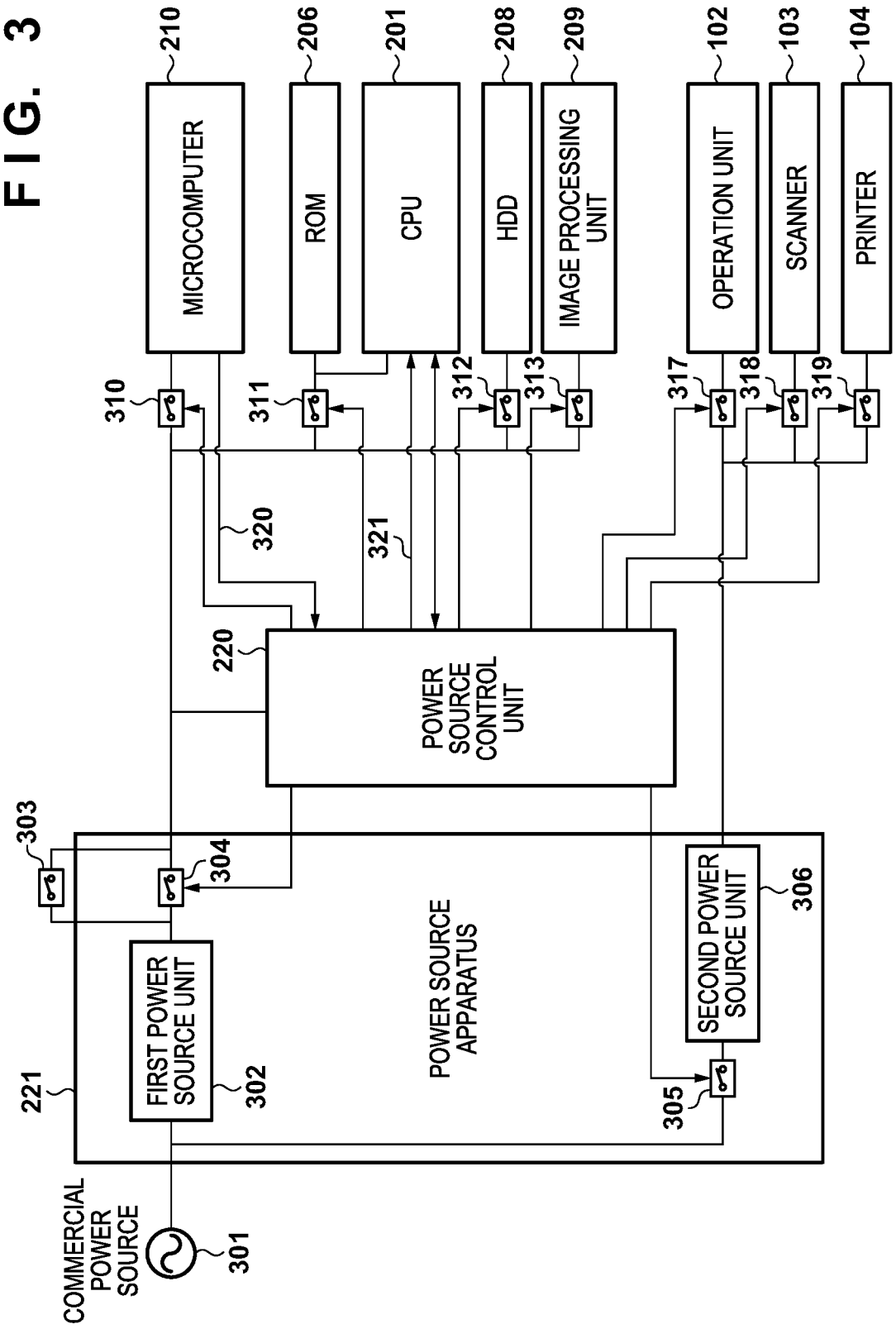
FIG. 3 is a view for illustrating a hardware configuration of the image processing apparatus according to an embodiment.

Next, with reference to FIG. 3, a power source configuration of the image processing apparatus 100 will be described. The power source apparatus 221 comprises a main power source switch 303, the first power source unit 302, the second power source unit 306, a switch 304, and a switch 305.

By the main power source switch 303 being turned on by a user, the main power source switch 303 conducts electricity, and power that the first power source unit 302 generates is supplied to the power source control unit 220. The power source control unit 220 performs power supply to each unit of the image processing apparatus 100 by turning on each of switches 304, 305, 310 to 313, and 317 to 319. After that, by the CPU 201 performing processing for activation in accordance with an activation program stored in the ROM 206, the image processing apparatus 100 transitions into an operation state in which it is possible to form an image.

Here, the image processing apparatus 100 has an operation state and a power saving state as power control states. In the operation state, the power source apparatus 221 performs power supply to each unit of the controller 101, the operation unit 102, the scanner 103, and the printer 104. Also, the CPU 201 transmits control signals via the system bus, and thereby rewrites register values inside of the power source control unit 220. The power source control unit 220, based on the rewritten register values, controls each switch 304, 305, 310 to 313, and 317 to 319 to be on/off, and thereby supplies power to each unit. In the operation state, a user can use functions, such as scan and print, of the image processing apparatus 100.

In the power saving state, the power source apparatus 221 supplies power to the power source control unit 220. Also, the CPU 201 enables power supply to a part of the controller 101 and controls the power source control unit 220 so that power supply of the operation unit 102, the scanner 103, and the printer 104 is disabled. The power source control unit 220 turns off the switch 312 and the switch 313 and the switches 317 to 319 connected to power supply lines to thereby shuts off the power supply. After that, by the power source control unit 220 turning off the switch 305 and turning off the second power source unit 306, standby power of the second power source unit is reduced. When, in the power saving state, it is detected at the power source control unit 220 that a button of the operation unit 102 was pressed by the user, or data was received from a network, or the like, the image processing apparatus 100 transitions to the operation state.

<Image Processing Apparatus Control Flow>

Figure 4:
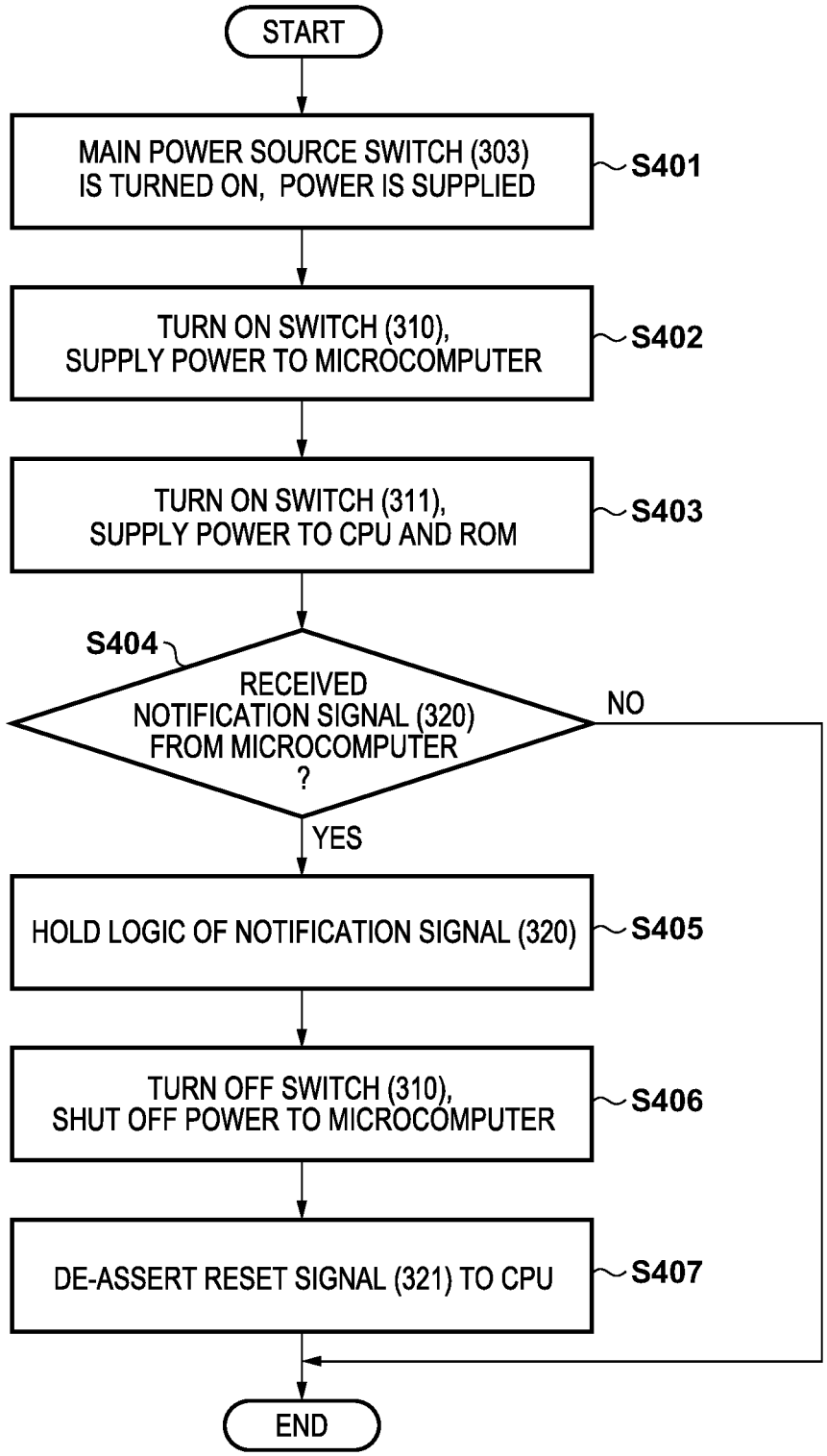
FIG. 4 is a flowchart for illustrating processing of the image processing apparatus according to an embodiment.
Figure 5:
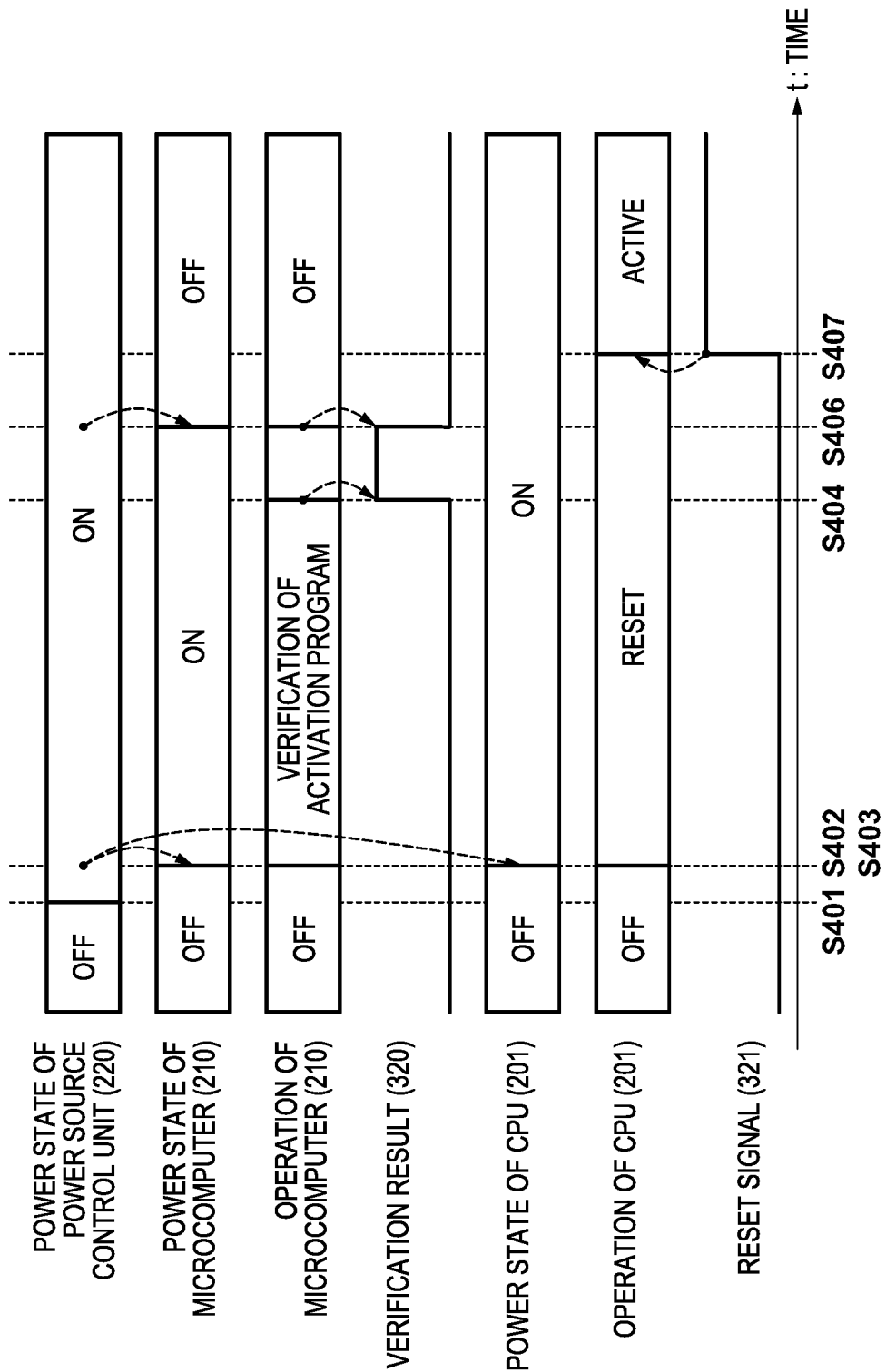
FIG. 5 is a timing chart for illustrating processing of the image processing apparatus according to an embodiment.

Next, with reference to the flowchart of FIG. 4, description is given of a power source control of the image processing apparatus 100 that the power source control unit 220 according to the present embodiment performs. The processing described below is something that the power source control unit 220 executes based on control signals from the CPU 201. Note that the processing that the CPU 201 executes is realized by reading a control program stored in advance in the ROM 206 or the HDD 208 into the RAM 207 and executing it. In other words, the processing described below is realized by each component operating in cooperation based on control signals of the CPU 201. Also, FIG. 5 is a timing chart that illustrates an operation state of the microcomputer 210 and the CPU 201. In the timing chart, the amount of time that has elapsed is indicated by the abscissa, and a relationship with each step of the flowchart of FIG. 4 is illustrated for operation and the power state of the power source control unit 220, the microcomputer 210, and the CPU 201.

Firstly, in step S401, by the main power source switch 303 being turned on by a user, the main power source switch 303 conducts electricity, and power that the first power source unit 302 generates is supplied to the power source control unit 220. Next, in step S402, the power source control unit 220, as an initial state after the power is turned on, turns on the switch 310 and supplies power to the microcomputer 210. Similarly, in step S403, the power source control unit 220, as an initial state after the power is turned on, turns on the switch 311 and supplies power to the CPU 201 and the ROM 206. Here, as illustrated in FIG. 5, since the reset signal 321 that is notified via the signal line 222 from the power source control unit 220 remains asserted, the CPU 201 is in a reset state and is not activated even though it is supplied with power. By this, it is possible to realize a secure boot.

In step S404, the power source control unit 220 determines whether or not a notification signal 320 that the microcomputer 210 output was received. When the notification signal 320 is received, the power source control unit 220 determines that a result of alteration verification by the microcomputer 210 was obtained, and the processing advances to step S405. In this way, the microcomputer 210, when supplied with power, performs alteration verification of the ROM 206, and notifies to the power source control unit 220 the verification result (the notification signal 320). Specifically, the microcomputer 210 obtains signature data stored in the ROM 206, and obtains a hash value of signature data by the public key. Next, the microcomputer 210 calculates the hash value from the activation program of the CPU 201 stored in the ROM 206. By performing comparison of these hash values, the microcomputer 210 verifies alteration of the activation program. The microcomputer 210, in a case where alteration has not been performed, outputs the notification signal 320 to the power source control unit 220. The power source control unit 220 receives the change in the signal level of the notification signal 320 and determines that alteration has not been performed.

Meanwhile, in a case where alteration is detected, the microcomputer 210 does not output the notification signal 320 to the power source control unit 220, and therefore processing for activation thereafter is not executed. In other words, the power source control unit 220, in a case where the signal level of the notification signal 320 does not change, determines that the microcomputer 210 detected an alteration, and ends the processing. Note that it is desirable that the determination timing of step S404 be set considering the processing speed of the microcomputer 210. Here, timeout control may be provided, but such control will be described in a second embodiment which is explained later. Here, the notification signal 320 is assumed to be output in a case where alteration has not been performed, but configuration may be such that there are a plurality of the notification signals 320, and the signals are divided into a signal indicating the end of verification and a signal indicating an alteration result. The microcomputer 210 outputs the signal indicating the end of verification, and the power source control unit 220 can determine the existence/absence of alteration by the signal level of a signal indicating an alteration result when the signal indicating the end of verification is received.

In step S405, the power source control unit 220 receives a change of the signal level of the notification signal 320 that the microcomputer 210 outputted, and holds the notified verification result in a register of the power source control unit 220. Here, the held verification result is held by the power source control unit 220 until the main power source switch 303 is turned off by the user and the image processing apparatus 100 turns off. By this, alteration of the activation program is verified only upon activation of the image processing apparatus 100, and thereafter, it is possible to hold the verification result without performing verification. For example, upon return from a sleep state or the like, the power source control unit 220 references the foregoing held verification result, and can transition the image processing apparatus into an operation state without re-verification by the microcomputer 210. In other words, because it is not necessary to perform power source supply to the microcomputer 210 in such a case, it is possible to reduce power consumption.

Next, in step S406, the power source control unit 220 turns off the switch 310 and thereby shuts off the power source of the microcomputer 210. As illustrated in FIG. 5, the microcomputer 210 enters an off state, and the notification signal 320 becomes indefinite. After that, in step S407, the power source control unit 220 de-asserts the reset signal 321 of the CPU 201 and ends the processing. The CPU 201, after the reset is deactivated, executes the activation program which is stored in the ROM 206 and has already been verified, and performs OS read and application software activation processing. By this, the image processing apparatus 100 transitions to an operation state in which it is possible to use functions such as scan and print.

As described above, the image processing apparatus according to the present embodiment comprises a CPU for controlling the image processing apparatus, and a microcomputer that verifies alteration of a program that is stored in a nonvolatile memory (ROM, HDD) and that the CPU executes and that outputs a notification signal that indicates the verification result. Furthermore, the image processing apparatus comprises a power source control unit for controlling a power source of the image processing apparatus, and the power source control unit, when the image processing apparatus is activated, supplies power to the microcomputer, and when a notification signal outputted from the microcomputer is received, holds the verification result that the notification signal indicates and shuts off the supply of power to the microcomputer. In this way, by turning off the power source of the microcomputer 210 after the end of a secure boot, it is possible to reduce power consumption of the image processing apparatus 100 while conducting a secure boot.

Also, the present invention further comprises a signal line for outputting a reset signal related to activation of the CPU from the power source control unit to the CPU. The power source control unit, when activating the image processing apparatus, supplies power to the microcomputer and the CPU, outputs the foregoing reset signal, and prevents activation of the CPU. Also, if the image processing apparatus does not detect an alteration of the program by the microcomputer, the image processing apparatus de-asserts the reset signal, and causes the CPU to activate. In this way, by virtue of the present embodiment, a secure boot is realized suitably.

Second Embodiment

Figure 6:
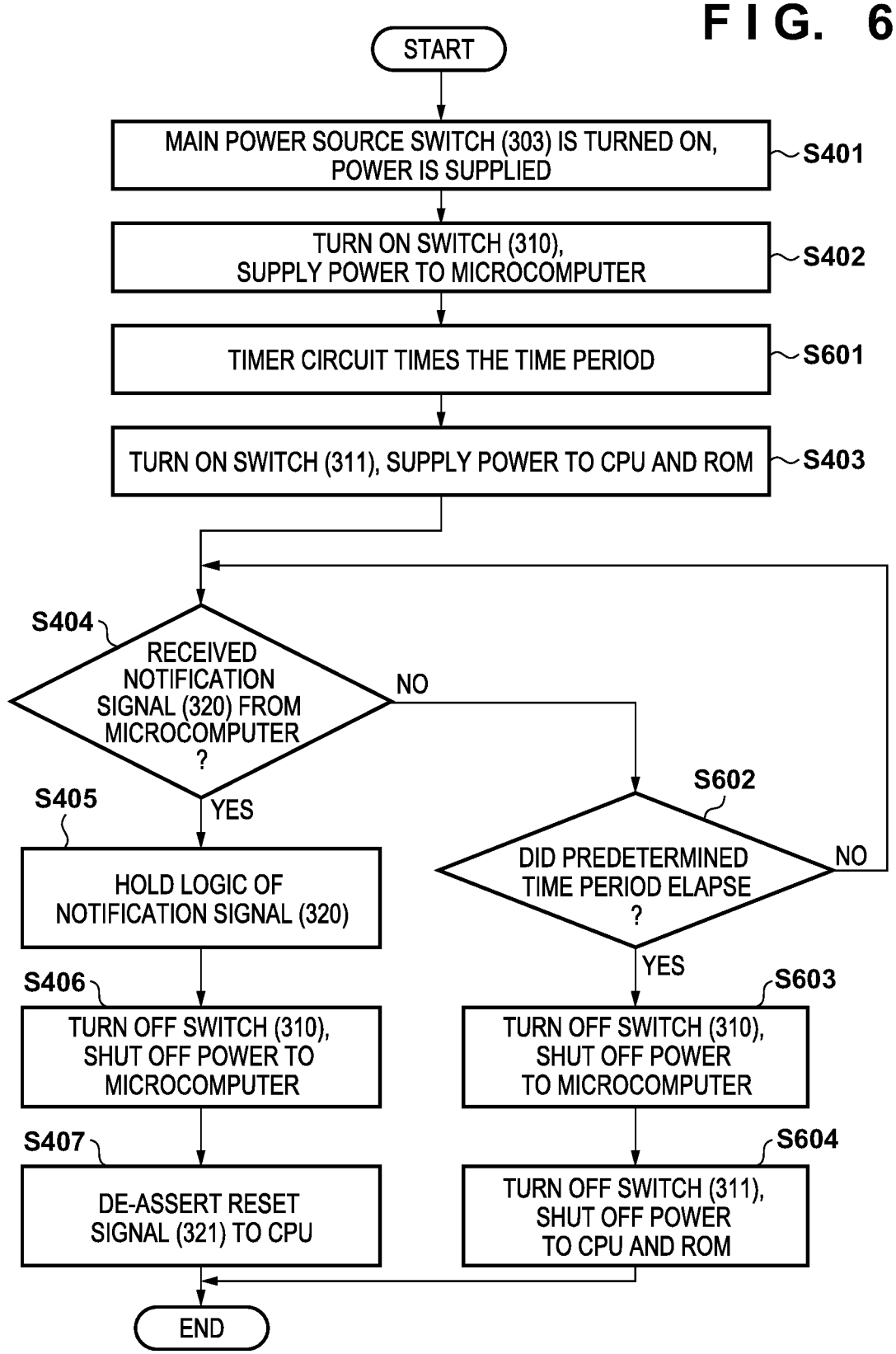
FIG. 6 is a flowchart for illustrating processing of the image processing apparatus according to an embodiment.

Below, description will be given for a second embodiment of the present invention. Next, with reference to the flowchart of FIG. 6, description is given of power source control of the image processing apparatus 100 that the power source control unit 220 according to the present embodiment performs. A difference from FIG. 4 is that the power source control unit 220 provides a timeout for alteration verification. Accordingly, below, description is given only for control that is different to in the foregoing first embodiment. For example, operation in a case where alteration has not been performed when the power source control unit 220 activates the microcomputer 210 and the microcomputer 210 performs alteration verification for the activation program is similar to in the foregoing first embodiment and therefore description thereof is omitted. The same step numbers are given for processing that is similar and description thereof is omitted.

In the case where the power source control unit 220 supplies power to the microcomputer 210 and alteration is detected during alteration verification of the activation program, a notification signal 320 is not outputted. Accordingly, after power is supplied to the microcomputer 210 in step S402, the power source control unit 220, in step S603, using a timer circuit (not shown) that it comprises, starts timing the elapsed time from when the power is supplied to the microcomputer 210, and the processing advances to step S403.

When it is determined in the determination of step S404 that the notification signal 320 has not been received from the microcomputer 210, the power source control unit 220, in step S602, determines whether or not a predetermined time period has elapsed for the time that the timer circuit has timed. If the predetermined time period has not elapsed, it is determined by the microcomputer 210 that alteration verification is in progress, the processing returns to step S404, and the outputting of the notification signal 320 is awaited.

Meanwhile, when it is determined that a predetermined time period has elapsed for the time period that is timed by the timer circuit, the power source control unit 220 determines that an alteration is detected by the microcomputer 210, and activation of the image processing apparatus 100 is stopped. The foregoing predetermined time period is set based on a time for reading an activation program from the ROM 206 and a time for calculating a hash value. Specifically, in step S603, the power source control unit 220 turns off the switch 310 and thereby shuts off the power source of the microcomputer 210. Next, in step S604, the power source control unit 220 turns off the switch 311 and thereby shuts off the power source of the CPU 201 and the ROM 206. In this way, in a case where alteration of the activation program is detected, the power source control unit 220 shuts off the power source of the CPU 201, and does not execute processing for activating the image processing apparatus 100.

As described above, the image processing apparatus according to the present embodiment, in addition to the configurations of the foregoing embodiments, provides timeout control in control for receiving a notification from the microcomputer 210. By this, it is possible to suitably handle problems of the microcomputer 210 or the like and also, similarly to in the foregoing first embodiment, turn off the microcomputer 210 and after that turn off the CPU 201 as well by the power source control unit 220 in a case where alteration by the microcomputer 210 is detected. Accordingly, it becomes possible to further reduce power consumption of the image processing apparatus 100 in the case where activation is stopped.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-009942 filed on Jan. 24, 2018, which is hereby incorporated by reference herein in its entirety.

What is claimed is:

1. An image processing apparatus, comprising:
one or more memories configured to store a verification program and a boot program;
a first processor;
a second processor configured to execute the verification program to verify whether the boot program stored in the one or more memories has been altered; and
a power controller configured to power down the second processor when the verification of whether the boot program stored in the one or more memories has been altered is completed by the second processor,
wherein the power controller is configured to supply power to the first processor even when the second processor is powered down, and
wherein the first processor is configured to execute the boot program if the second processor has verified that the boot program has not been altered and not to execute the boot program if the second processor has determined that the boot program has been altered.

2. The image processing apparatus according to claim 1, further comprising a signal line configured to output a reset signal related to activation of the first processor from the power controller to the first processor, wherein
the power controller, when the image processing apparatus is activated, supplies power to the second processor and the first processor and outputs the reset signal.

3. The image processing apparatus according to claim 2, wherein
the power controller further de-asserts the reset signal to the first processor in a case where the second processor has verified that the boot program has not been altered.

4. The image processing apparatus according to claim 2, wherein
the power controller further stops activation of the image processing apparatus in a case where the second processor has determined that the boot program has been altered.

5. The image processing apparatus according to claim 1, wherein the second processor outputs a notification signal to the power controller after the second processor completes verification concerning the alteration of the boot program, and the power controller powers down the second processor in accordance with the notification signal.

6. The image processing apparatus according to claim 5, wherein the second processor does not output the notification signal indicating the verification result when the alteration of the boot program is detected, and does output the notification signal if the alteration of the boot program is not detected.

7. The image processing apparatus according to claim 6, wherein the power controller comprises
a timer circuit configured to time an elapsed time from when the power is supplied to the second processor, and
when a time period timed by the timer circuit exceeds a predetermined time period, determines that the notification signal indicating the verification result was not outputted by the second processor.

8. The image processing apparatus according to claim 7, wherein
the power controller, when it determines that the notification signal indicating the verification result was not outputted by the second processor, shuts off the supply of power to the first processor and the second processor.

9. The image processing apparatus according to claim 1, wherein the second processor is a microcomputer provided on a single chip.

10. The image processing apparatus according to claim 1, wherein the one or more memories are nonvolatile memories.

11. The image processing apparatus according to claim 1, wherein the power controller holds a verification result of the boot program by the second processor and powers down the second processor.

12. The image processing apparatus according to claim 1, further comprising: a power switch,
wherein the power controller turns on the second processor in accordance with an operation of the power switch and then the second processor executes the verification program to verify whether the boot program has been altered.

13. The image processing apparatus according to claim 1, further comprising:
a power supply configured to supply power to the second processor, and a switch arranged between the power supply and the second processor,
wherein the power controller turns the switch off after the second processor completes the verification concerning alteration of the boot program.

14. A method of controlling an image processing apparatus that comprises one or more memories configured to store a verification program and a boot program, a first processor, a second processor, and a power controller, the method comprising:
  in the second processor,
    executing the verification program to verify, based on hash data, whether the boot program stored in the one or more memories has been altered,
  in the power controller,
    powering down the second processor when the verification of whether the boot program stored in the one or more memories has been altered is completed by the second processor, and
    supplying power to the first processor even when the second processor is powered down, and
  in the first processor,
    executing the boot program if the second processor has verified that the boot program has not been altered and not executing the boot program if the second processor has determined that the boot program has been altered.

15. A non-transitory computer-readable storage medium storing a computer program for causing a computer to execute a method of controlling an image processing apparatus that comprises one or more memories configured to store a verification program and a boot program, a first processor, a second processor, and a power controller, the method comprising:
  in the second processor,
    executing the verification program to verify whether the boot program stored in the one or more memories has been altered,
  in the power controller,
    powering down the second processor based on completion when the verification of whether the boot program stored in the one or more memories has been altered is completed by the second processor, and
    supplying power to the first processor even when the second processor is powered down, and
  in the first processor,
    executing the boot program if the second processor has verified that the boot program has not been altered and not executing the boot program if the second processor has determined that the boot program has been altered.

* * * * *